(12) United States Patent
Chang et al.

(10) Patent No.: US 7,467,320 B2
(45) Date of Patent: * Dec. 16, 2008

(54) FAULT-TOLERANT CLOCK GENERATOR

(75) Inventors: Kun-Yung K. Chang, Los Altos, CA (US); Mark A. Horowitz, Menlo Park, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/456,332

(22) Filed: Jul. 10, 2006

(65) Prior Publication Data

US 2006/0250160 A1    Nov. 9, 2006

Related U.S. Application Data

(63) Continuation of application No. 10/426,736, filed on Apr. 30, 2003, now Pat. No. 7,089,442.

(60) Provisional application No. 60/445,947, filed on Feb. 7, 2003.

(51) Int. Cl.
*G06F 1/04* (2006.01)

(52) U.S. Cl. .......................................... 713/501; 714/2

(58) Field of Classification Search ....................... None
See application file for complete search history.

(56) References Cited

U.S. PATENT DOCUMENTS

| | | | | |
|---|---|---|---|---|
| 4,984,241 A | * | 1/1991 | Truong | 714/797 |
| 5,404,363 A | * | 4/1995 | Krause et al. | 714/814 |
| 5,557,623 A | * | 9/1996 | Discoll | 714/814 |
| 5,742,798 A | | 4/1998 | Goldrian | |
| 5,852,728 A | * | 12/1998 | Matsuda et al. | 713/501 |
| 6,194,969 B1 | * | 2/2001 | Doblar | 331/2 |
| 6,731,709 B2 | * | 5/2004 | Doblar | 375/357 |

FOREIGN PATENT DOCUMENTS

JP    2000035831 A2    2/2000

* cited by examiner

*Primary Examiner*—Dennis M Butler
(74) *Attorney, Agent, or Firm*—Vierra Magen Marcus & DeNiro LLP (57) ABSTRACT

A fault-tolerant clock generation circuit. First and second clock signal generators are provided to generate first and second clock signals. The second clock signal generator includes a locked loop circuit that, in a first operating mode, adjusts the phase of the second clock signal as necessary to maintain phase alignment between the first and second clock signals. A fail detect circuit is provided to determine whether a failure relating to generation of the first clock signal has occurred and, if so, to assert a hold signal. The locked loop circuit responds to assertion of the hold signal by transitioning to a second operating mode in which the phase of the second clock signal is not adjusted.

10 Claims, 6 Drawing Sheets

FIG. 9

FAULT-TOLERANT CLOCK GENERATOR

CROSS-REFERENCE TO RELATED APPLICATIONS

This application is a continuation of U.S. patent application Ser. No. 10/426,736 filed Apr. 30, 2003, now allowed, which claims priority from U.S. Provisional Application Ser. No. 60/445,947 filed Feb. 7, 2003.

FIELD OF THE INVENTION

The present invention relates generally to synchronous electronic devices and systems, and more particularly to clock signal generation in fault-tolerant devices and systems.

BACKGROUND

Fault-tolerance is designed into electronic systems by providing redundant capability for critical functions. In synchronous fault-tolerant systems, redundant clock generators are often provided to enable switchover from one clock generator to another in response to a failure detection. Unfortunately, switching between clock generators is not a trivial task. Even if two clock generators are identical in design and construction, they typically generate clock signals that exhibit at least a small frequency difference and therefore drift out of phase with each other. Consequently, an abrupt transition from one clock generator to another is likely to yield a shortened high or low pulse within the clock waveform, referred to herein as a runt pulse. If short enough, the runt pulse may violate settle- and hold-time constraints of circuit elements clocked by the clock signal, resulting in improper circuit operation and ultimately to the type of system failure sought to be avoided by the redundant clock generator in the first place.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal.

In embodiments of the present invention a locked loop circuit is provided to maintain phase alignment between a backup clock signal generated by a backup clock generator and a master clock signal generated by a master clock generator. The backup clock signal and the master clock signal are input to a select circuit which, under normal operating conditions, selects the master clock signal to drive a clock line coupled to one or more synchronous circuit elements. If a failure of the master clock generator is detected, a switchover to the backup clock signal is performed. In the switchover, the select circuit selects the backup clock signal to drive the clock line, and the locked loop circuit is disabled from maintaining phase alignment between the backup clock signal and the master clock signal.

Failure modes within the master and backup clock generators are distinguished herein as being either hard failures or soft failures. In a hard failure, the clock signal generated by the master or backup clock generator stops oscillating, or begins oscillating at a frequency so far above or below a nominal frequency that the locked loop circuit is unable to maintain phase alignment between the master and backup clock signals. In a soft failure, the clock signal generated by the master or backup clock generator oscillates at a frequency that is out of tolerance (i.e., a frequency that exceeds or is less than the nominal frequency by more than a specified deviation), but not so far out of tolerance that the locked loop circuit is unable to maintain phase alignment between the backup and master clock signals. Embodiments for detecting and responding to both soft and hard failures are disclosed herein.

Figure 1:
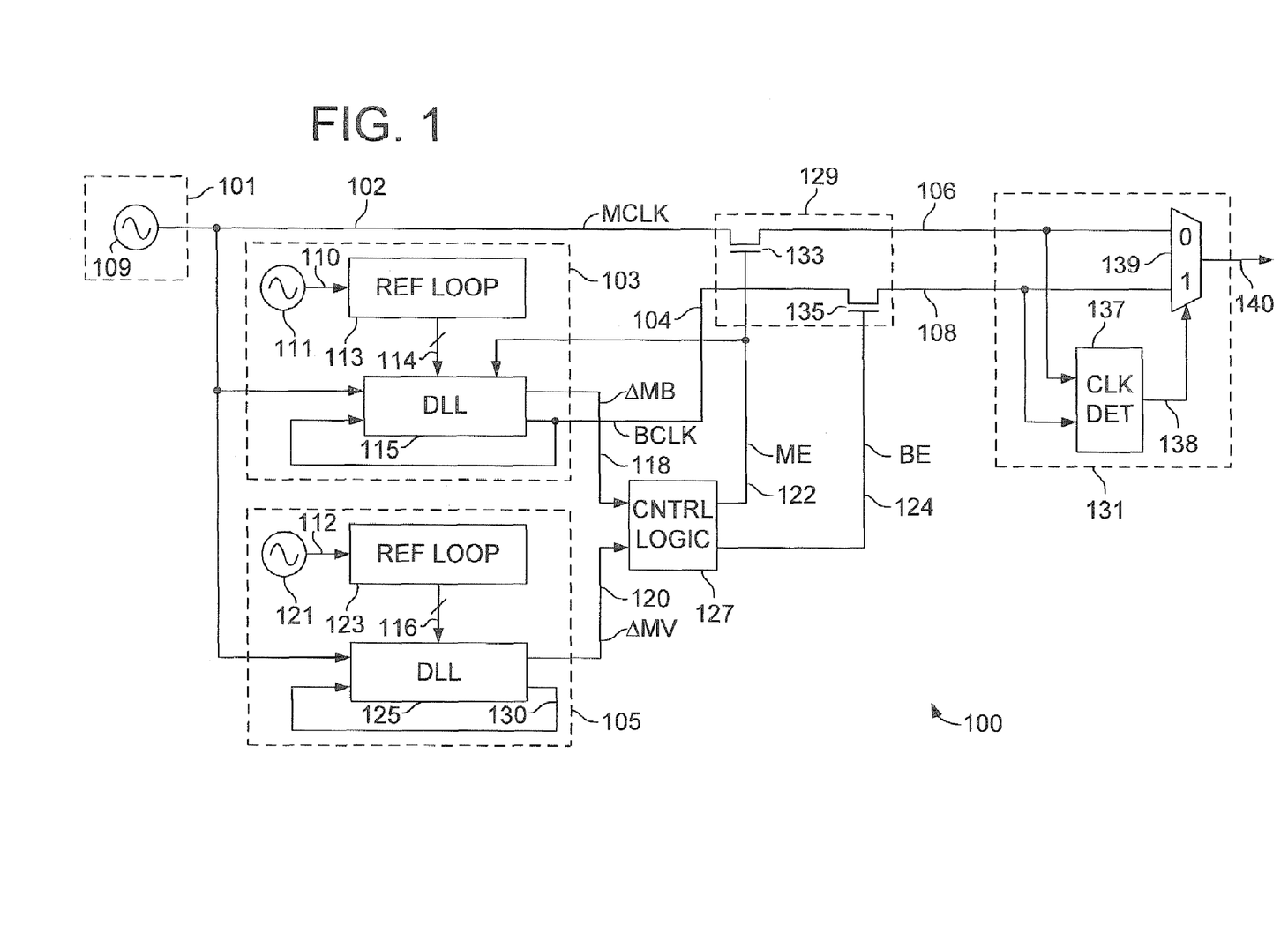
FIG. 1 illustrates a fault-tolerant clock generation circuit according to an embodiment of the invention.

FIG. 1 illustrates a fault-tolerant clock generation circuit 100 according to an embodiment of the invention. The clock generation circuit 100 includes a master clock generator 101, backup clock generator 103, vote clock generator 105, control logic 127, gating circuit 129, and clock selector 131. The master clock generator 101 includes a clock source 109 to generate a master clock signal 102 which is output to the gating circuit 129, backup clock generator 103 and vote clock generator 105. Though not shown, the master clock generator 101 may include a locked loop circuit (e.g., a delay locked loop (DLL) circuit or phase locked loop (PLL) circuit) to enable the master clock signal 102 to be frequency-multiplied and/or phase shifted relative to the clock signal generated by the clock source 109.

The backup clock generator 103 includes a clock source 111, reference loop 113 and DLL circuit 115. The clock source 111 generates a clock signal 110 having a frequency nominally equal to the frequency of the master clock signal 102. That is, the frequency of the clock signal 110 is ideally equal to the frequency of the master clock signal 102, but in reality will be higher or lower up to a specified tolerance such that the phase of the clock signal 110 will drift relative to the phase of the master clock signal 102. The clock signal 110 is supplied to the reference loop 113 which, in turn, generates a plurality of clock signals 114 referred to herein as phase vectors. In the absence of a frequency multiplying circuit, each of the phase vectors has a frequency substantially equal to the frequency of the clock signal 110, but is progressively delayed in phase through a cycle of the clock signal 110. For example, in one implementation, the clock signal propagates through a chain of N delay elements within the reference loop 113, with each of the delay elements outputting complementary clock signals that are delayed relative to clock signals input to the delay element by a phase angle, $\phi=T/2N$, where T is the period of the clock signal 110. By this arrangement, a set of phase vectors 114 having phase offsets of $\phi$, $2\phi$, $3\phi$, ..., $N\phi$ is generated. Note that the reference loop 113 may alternatively be a PLL circuit (or include a frequency-multiplying circuit) such that the phase vectors 114 are frequency multiples of the clock signal 110.

The phase vectors 114 are input to the DLL circuit 115 along with the master clock signal 102 and a master enable signal 122 (ME) generated by the control logic 127. The DLL circuit 115 selects, and interpolates between, a phase-adjacent pair of the phase vectors 114 to generate a backup clock signal 104. When the master enable signal 122 (ME) is asserted (e.g., to a logic high state), the DLL circuit 115 dynamically adjusts the phase vector selection and interpolation as necessary to maintain phase alignment between the backup clock signal 104 and the master clock signal 102. That is, the DLL circuit 115 is operated in a tracking mode in which the phase of the backup clock signal 104 is periodically adjusted to maintain phase alignment (and therefore frequency alignment) between the backup and master clock signals. By contrast, when the master enable signal 122 is deasserted, the DLL circuit 115 is operated in a hold mode in which the selection and interpolation of phase vectors 114 is held constant (i.e., not adjusted). Thus, in the hold mode, the backup clock signal 104 does not track the master clock signal 102, but rather oscillates freely at the frequency (or multiplied frequency) of the clock source 111.

In addition to generating the backup clock signal 104, the DLL circuit 115 generates an error value 118 ($\Delta$MB) which represents a frequency difference between the master clock signal and a selected one of the phase vectors 114, referred to herein as the backup reference. In one embodiment, the backup reference has substantially the same frequency as the clock signal 110 so that the error value 118 represents a frequency difference between the master clock signal 102 and the clock signal 110. In an embodiment in which the reference loop is replaced by a PLL circuit (or other frequency multiplying circuit), the backup reference is a frequency multiple of the clock signal 110. In either case, if the DLL circuit 115 is unable to achieve phase lock between the master clock signal 102 and backup clock signal 104, then a hard failure has occurred and the error value 118 is set to a predetermined value, referred to herein as a hard fail code, to indicate the non-locking state of the DLL circuit. In one embodiment, the hard fail code is the maximum value that can be represented by the error value. In an alternative embodiment, a bit of the error value is reserved to carry a dedicated hard-fail signal. That is, the hard fail code is expressed by any error value in which the reserved bit is set. Other hard fail codes may be used in yet other embodiments.

In the embodiment of FIG. 1, the vote clock generator 105 includes a clock source 121, reference loop 123 (or PLL circuit) and DLL circuit 125 that operate in generally the same manner as the corresponding components of the backup clock generator 103. The vote clock generator 105 generates a vote clock signal 130 that is phase aligned with the master clock signal 102 (the master clock signal 102 being input to the DLL circuit 125) and an error value 120 ($\Delta$MV) that represents a frequency difference between a vote reference (i.e., a reference vector generated by the reference loop 123) and the master clock signal 102. As in the backup clock generator 103, the vote clock generator 105 sets the error value 120 to the hard fail code in the event of a hard failure, thereby indicating the non-locking state of the DLL circuit 125. In one embodiment, the vote clock generator 105 operates exclusively in the tracking mode and does not include a hold input or circuitry necessary for enabling the hold mode. Alternatively, to simplify circuit layout and verification, the vote clock generator 105 may be a replication of the backup clock generator 103, and may be operable in either a tracking mode or hold mode.

The error values 118 and 120 generated by the backup and vote clock generators (i.e., the backup error value and vote error value) are input to the control logic 127 which, in turn, outputs the master enable signal 122 and a backup enable signal 124 to the gating circuit 129 to selectively enable the master clock signal and the backup clock signal onto master and backup clock lines 106 and 108. The control logic 127 initially evaluates the error values 118 and 120 to determine whether a hard failure has occurred. If both of the error values indicate the hard fail code, then the master clock generator 101 is assumed to be in hard failure (i.e., because a hard failure of the master clock generator 101 is the most likely cause of a hard failure indication by both the backup and vote clock generators) and the master enable signal 122 is deasserted to prevent the master clock signal 102 from being output on the master clock line 106. If the backup error value 118 indicates the hard fail code, but the vote error value 120 does not, then the backup clock generator 103 is assumed to be in hard failure (i.e., because the master clock generator 101 cannot logically be in hard failure without producing a corresponding hard fail indication in the vote clock generator 105) and the backup enable signal 124 is deasserted to prevent the backup clock signal 104 from being output onto the backup clock line 108. Conversely, if the vote error value 120 indicates the hard fail code, but the backup error value 118 does not, then the vote clock generator 105 is assumed to be in hard failure. In this condition, the control logic 127 does not proceed to check for soft failure and maintains assertion of both the master and backup enable signals 122 and 124. In the event of any hard failure detection, the clock generation circuit 101 may assert an error signal or set a status value to alert one or more other components within the system or integrated circuit that a failure has occurred.

If neither of the error values 118 and 120 indicates a hard failure condition, then the control logic 127 proceeds to determine whether a soft failure has occurred within the master or backup clock generators. In one embodiment, the control logic 127 compares the backup error value 118 against a predetermined error threshold. If the backup error value 118 exceeds the error threshold (i.e., the frequency difference between the master clock signal 102 and the backup reference is beyond tolerance), then a soft failure has occurred within one or the other (or possibly both) of the master and backup clock generators (101, 103). If a soft failure is detected, then the vote error value 120 is used to determine which of the master and backup clock generators has produced an out-of-tolerance clock signal. More specifically, the control logic 127 evaluates the vote error value 120 to determine which of the master and backup clock signals (102, 104) is nearest in frequency to the vote reference. If the master clock signal frequency is nearest to the vote reference frequency, then the backup clock generator 103 is deemed to be in soft failure and the backup enable signal 124 is deasserted to disable the backup clock signal from being output onto the backup clock line 108. Conversely, if the backup reference frequency is nearest to the vote reference frequency, then the master clock generator 101 is deemed to be in soft failure. In that case, the master enable signal 122 is deasserted to disable the master clock signal from being output onto the master clock line 106, and to establish hold mode operation within the DLL circuit 115 of the backup clock generator 103. Thus, in the event of a soft failure of the master clock generator or backup clock generator, the vote clock generator enables a determination of which of the clock generators has failed; in effect, voting for one clock generator or the other through generation of the error value 120.

Figure 2:
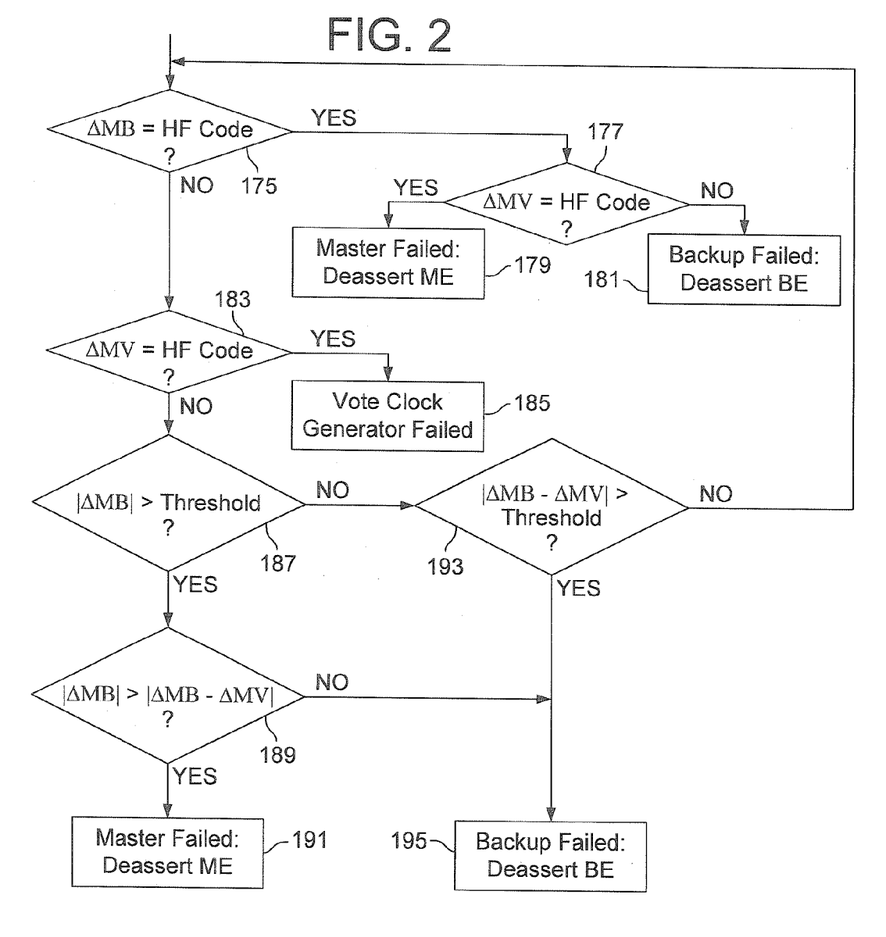
FIG. 2 illustrates the operation of the control logic of FIG. 1 according to one embodiment.

FIG. 2 illustrates the operation of the control logic 127 of FIG. 1 according to one embodiment. Starting at 175, the control logic determines whether the backup error value indicates a hard failure (i.e., whether the error, ΔMB is set to the hard fail code, HF Code). If so, then at 177, the control logic determines whether the vote error value indicates a hard failure. If the vote error value does not indicate a hard failure, then the backup clock generator is deemed to be in hard failure and the backup enable signal is deasserted at 181. If, the vote error value is determined to indicate a hard failure at 177, then the master clock generator is deemed to be in hard failure and the master enable signal is deasserted at 179. Referring briefly to FIG. 1, deassertion of the master enable signal operates to place the backup clock generator 103 in hold mode so that the backup clock signal 104 oscillates freely (i.e., without further phase adjustment) at the frequency (or multiplied frequency) of the clock signal 110.

Returning to FIG. 2, if the backup error value is determined not to indicate a hard failure at 175, then at 183 the control logic determines whether the vote error value indicates a hard failure. If so, then the vote clock generator is deemed to be in hard failure and the error checking operation of the control logic is concluded at 185. That is, because no valid vote error value is available to resolve a soft failure indication by the backup error value, soft failure checking is not performed.

If no hard failure is detected at 183, then the absolute value of the backup error value, referred to herein as the primary error, |ΔMB|, is compared with an error threshold at decision block 187. If the primary error exceeds the error threshold, then at 189 the primary error is compared the absolute value of the difference between the backup error value and vote error value. The difference between the error values represents the frequency difference between the backup reference and the vote reference and is referred to herein as the secondary error. If the primary error exceeds the secondary error, then the vote reference is nearer in frequency to the backup reference than to the master clock signal. That is, the vote clock generator indicates that the master clock generator is more likely to be in soft failure than the backup clock generator. Accordingly, at 191, the master enable signal is deasserted. Conversely, if the secondary error exceeds the primary error, then the vote clock signal is nearer in frequency to the master clock signal than to the backup clock signal (i.e., the vote clock generator indicates that the backup clock generator is more likely to be in soft failure than the master clock generator), and, at 195, the backup enable signal is deasserted.

Returning to decision block 187, if the primary error does not exceed the threshold, then at 193, the secondary error is compared with the error threshold. If the secondary error exceeds the error threshold, then the backup clock generator is deemed to have failed. Accordingly, at 195, the backup enable signal is deasserted to prevent the backup clock signal from being output onto the backup clock line.

Figure 3A:
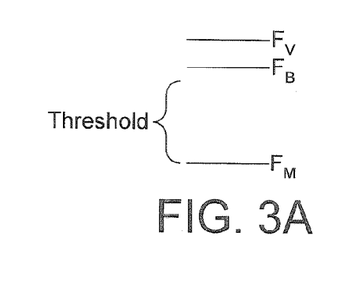
FIGS. 3A, 3B and 3C illustrate soft failure scenarios that are detected and acted upon by the clock generation circuit of FIG. 1.
Figure 3B:
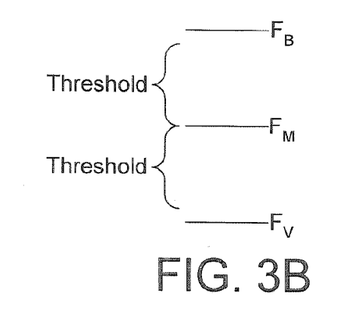
Figure 3C:
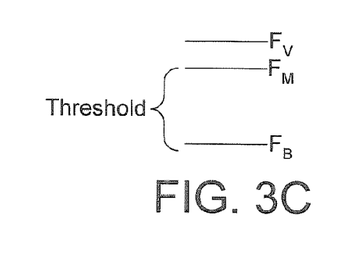

FIGS. 3A, 3B and 3C illustrate soft failure scenarios that are detected and acted upon by the clock generation circuit 100 of FIG. 1. In the scenario of FIG. 3A, the backup reference frequency ($F_B$) exceeds the master clock frequency ($F_M$) by more than an error threshold. Because the backup reference frequency is relatively close to the vote reference frequency ($F_V$), the secondary error is substantially less than the primary error, indicating that the master clock generator is the most likely source of the failure. Accordingly, in the scenario of FIG. 3A, the control logic 127 of FIG. 1 deasserts the master enable signal to prevent the master clock signal from being output onto the master clock line.

The backup clock frequency also exceeds the master clock frequency by more than the error threshold in the scenario of FIG. 3B. In this case, however, the vote reference is nearer in frequency to the master clock signal than to the backup reference. Accordingly, the backup clock generator is deemed to have failed and the backup enable signal is deasserted to prevent the backup clock signal from being output onto the backup clock line. Note that this result is attained despite the fact that the frequency difference between the master clock signal and the vote reference also exceeds the error threshold.

In the scenario of FIG. 3C, the primary error (i.e., absolute value of the difference between the master and backup reference frequencies) does not exceed the error threshold, but the secondary error (i.e., absolute value of the difference between the backup reference and vote reference frequencies) does exceed the error threshold. Thus, in the diagram of FIG. 2, decision block 193 yields an affirmative result, and the backup enable signal is deasserted at 195 to prevent the backup clock signal from being output onto the backup clock line.

Referring again to FIG. 1, the gating circuit 129 selectively enables the master and backup clock signals 102 and 104 to be output onto the master and backup clock lines 106 and 108, respectively. In one embodiment, the gating circuit includes transistors 133 and 135 coupled in a pass-gate configuration. That is, source terminals of the transistors 133 and 135 are coupled to receive the master and backup clock signals 102 and 104, respectively; drain terminals of the transistors are coupled to the master and backup clock lines 106 and 108, and gate terminals are coupled to receive the master and backup enable signals 122 and 124. By this arrangement, the master clock signal 102 is output onto to the master clock line 106 when the master enable signal 122 is asserted, and the backup clock signal 104 is output onto the backup clock line 108 when the backup enable signal 124 is asserted. Other types of circuit elements (e.g., multi-transistor logic AND circuits) may be used to perform the selective gating function of the transistors 133 and 135 in alternative embodiments.

The clock selector 131 includes a clock detect circuit 137 and a multiplexer 139, each coupled to the master and backup clock lines 106 and 108. The clock detector 137 determines whether the master clock signal 102 is oscillating (i.e., on the master clock line 106) and, if so, outputs a logic low select signal 138 to the multiplexer 139 to select the master clock signal to be output on clock line 140. If the clock detector 137 determines that the master clock signal is not oscillating, the clock detector 137 outputs a logic high select signal 138 to the multiplexer 139 to select the backup clock signal 104 to be output on clock line 140. Thus, if the master enable signal 122 is deasserted due to a hard or soft failure of the master clock generator 101, the clock detector 137 will detect the non-oscillation of the master clock signal on the master clock line 106 and automatically switchover to the backup clock signal. Also, because the backup clock signal 104 is phase aligned with the master clock signal 102 up to the time the master enable signal 122 is deasserted (or up until the time the master clock signal 102 stops oscillating), the switchover to the backup clock signal results in a transition to a clock signal that is substantially in phase with the master clock signal 102, avoiding generation of runt clock pulses that violate setup and hold times of downstream synchronous circuit elements.

Still referring to FIG. 1, it should be noted that in some systems, the nominal frequency of the master clock signal 102 may be so high that a failure detection and subsequent switchover to the backup clock signal 104 cannot be completed within a cycle time of the master clock signal 102. In such a system, deassertion of the master enable signal 122 may result in one or more missing clock pulses on the output clock line 140 while the clock detector 137 detects non-oscillation of the master clock signal and transitions the select signal 138 to select the backup clock signal. In one embodiment, a locked loop circuit is coupled to receive the clock signal output on clock line 140. The locked loop circuit generates a clock signal that is phase locked to the clock signal selected by the multiplexer 139 and preferably includes a free-running oscillator (e.g., a voltage-controlled oscillator) so that, if a small number of clock pulses are dropped during transition between the master and backup clock signals, the locked loop circuit will supply the missing clock pulses during the transition interval.

Figure 4:
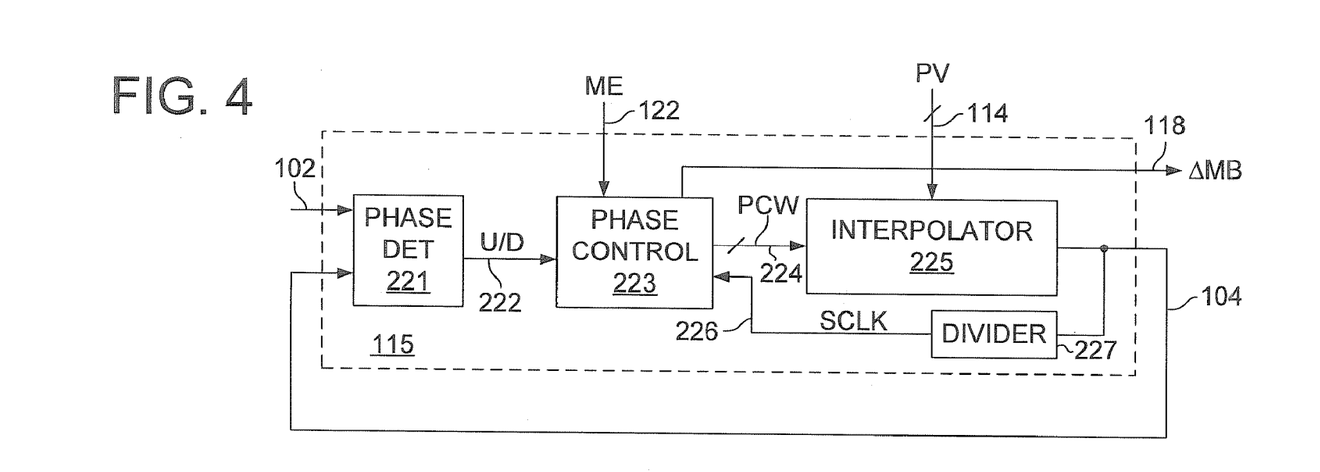
FIG. 4 illustrates the DLL circuit 115 of FIG. 1 according to an embodiment of the invention.

FIG. 4 illustrates the DLL circuit 115 of FIG. 1 according to an embodiment of the invention. The DLL circuit 115 includes a phase detector 221, phase control circuit 223, interpolator 225 and clock divider 227. The phase detector 221 receives the master clock signal 102 and the backup clock signal 104 (i.e., a feed back clock signal generated by the interpolator 225) and generates a phase adjust signal 222 (U/D) that indicates which of the clock signals leads the other. The phase control circuit 223 receives the phase adjust signal 222 from the phase detector 221, along with a frequency-divided version of the backup clock signal 226 (referred to herein as a slow clock signal (SCLK)) from the clock divider 227, and the master enable signal 122 from the control logic. When the master enable signal 122 is asserted, the DLL circuit 115 is operated in the tracking mode. In the tracking mode, the phase control circuit 223 is enabled to adjust a phase control word 224 (PCW) according to the state of the phase adjust signal 222 sampled at transitions of the slow clock signal 226. Conversely, when the master enable signal 222 is deasserted, the DLL circuit 115 is operated in a hold mode in which the phase control word 224 is held constant regardless of the state of the phase adjust signal 222. The interpolator 225 receives the phase vectors 114 from a reference loop (or PLL circuit or similar circuit) and the phase control word 224 from the phase control circuit. In one embodiment, the phase control word 224 is an N-bit value in which the most significant M bits form a vector select value and the least significant N-M bits from an interpolation value. The vector select value is used to select a phase-adjacent pair of the phase vectors 114, and the interpolation value is used to interpolate between the selected phase vectors. Thus, in the tracking mode, as the phase control word 224 is incremented or decremented, interpolation is shifted toward one or the other of the selected phase vectors. If the phase control word is incremented or decremented such that the interpolation value overflows or underflows (i.e., transitions from a maximum value to a minimum value or vice-versa) the vector select value is correspondingly incremented or decremented to select a new pair of phase-adjacent vectors; the new pair of phase vectors bounding a phase range that neighbors the phase range bounded by the previously selected phase vectors.

As an example of the overall operation of the DLL circuit 115, consider a master clock signal that oscillates at a slightly lower frequency than the backup reference. In that case the phase detector 221 will repeatedly detect that the backup reference leads the master clock signal and output a phase adjust signal 222 in an increment state. When in the tracking mode, the phase control circuit 223 samples the phase adjust signal in response to the slow clock signal 226 and increments the phase control word 224, shifting interpolation toward a lagging one of the selected phase vectors, thereby retarding the phase of the backup clock signal 104. Through this operation, the phase control word 224 is incremented as necessary to rotate the backup clock signal 104 through a progressively increased phase angle to maintain phase alignment with the master clock signal 102.

Still referring to FIG. 4, the phase control circuit 223 additionally generates the backup error value 118. As discussed above, the backup error value 118 represents a frequency difference between the master clock signal 102 and the backup reference (i.e., an arbitrary one of the phase vectors 114). In one embodiment, the phase control circuit 223 generates the backup error value 118 by periodically subtracting the phase control word 224 from a previously generated phase control word to generate a phase change value, thereby generating a value that indicates a phase change per unit time (i.e., a frequency difference) between the master clock signal 102 and the backup reference.

Figures 5, 6:
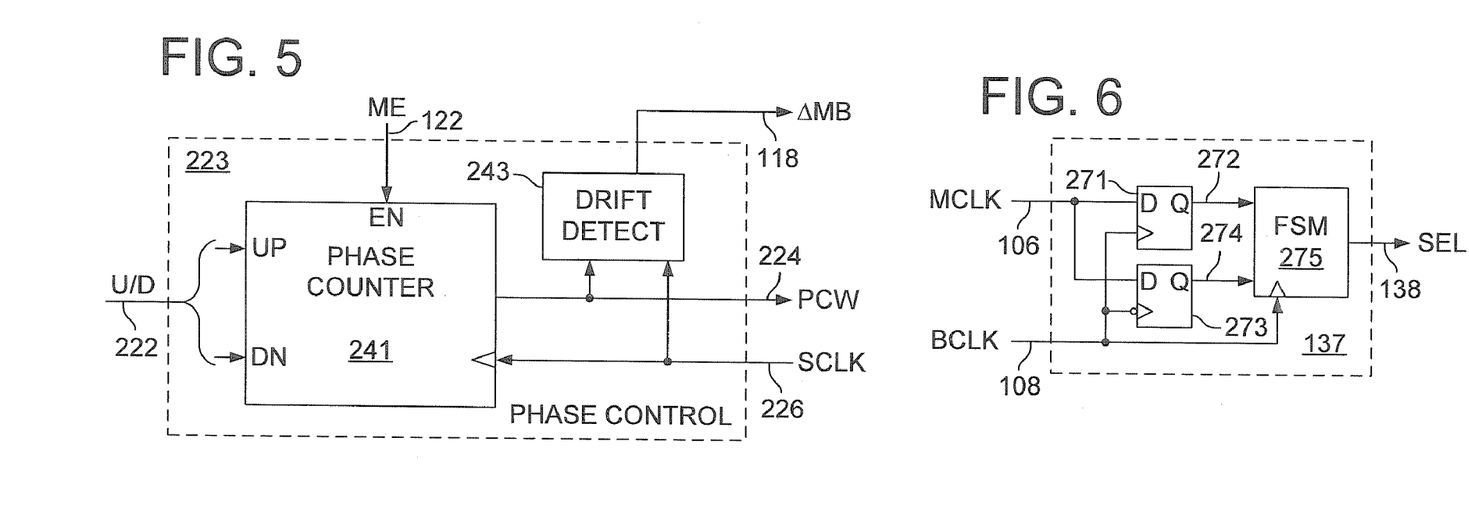
FIG. 5 illustrates the phase control circuit of FIG. 4 according to an embodiment of the invention.
FIG. 6 illustrates an embodiment of the clock detect circuit of FIG. 1.

FIG. 5 illustrates the phase control circuit 223 of FIG. 4 according to an embodiment of the invention. The phase control circuit 223 includes a phase counter 241 and drift detect circuit 243. The phase counter 241 receives the master enable signal 122, phase adjust signal 222 and slow clock signal 226 as inputs, and outputs an internally maintained phase count value as the phase control word 224. When the master enable signal 122 is deasserted, the phase count value is held constant to produce a constant phase control word 224. When the master enable signal 122 is asserted, the phase counter 241 increments and decrements the phase count value (and therefore the phase control word 224) according to the state of the phase adjust signal 222 sampled at transitions of the slow clock signal 226. The drift detect circuit 243 samples the phase control word after each K transitions of the slow clock signal 226 (K being an integer value greater than zero), subtracts the newly sampled phase control word from a previously sampled phase control word to generate the error value 118, and stores the newly sampled phase control word in a storage register (i.e., to be used as the previously sampled word in the next error value determination), overwriting the previously sampled phase control word. The phase control circuit 223 or any component thereof may be implemented by any number of circuits ranging from a dedicated state machine to a programmed processor (e.g., a general purpose processor or digital signal processor). Also, the phase control circuit 223 or any component thereof may be disposed within an integrated circuit (or system of integrated circuits) that is distinct from an integrated circuit containing the DLL circuit 115.

Referring again to FIG. 4, the DLL circuit 115 may additionally include a clock tree circuit coupled to the output of the interpolator 225 to generate multiple instances of the backup clock signal 104, one of which is returned to the phase detector 221 as the feedback clock signal. In such an embodiment, the pass gate 133 of FIG. 1 (or other gating element) may be disposed between the output of the interpolator 225 and the input of the clock tree to avoid the need to gate multiple clock signals output from the clock tree.

FIG. 6 illustrates an embodiment of the clock detect circuit 137 of FIG. 1. The clock detect circuit 137 includes a pair of flip-flops 271 and 273, and a finite state machine 275 (FSM), all having clock inputs coupled to receive the backup clock signal via the backup clock line 108. Data inputs of the flip-flops 271 and 273 are coupled to receive the master clock signal via master clock line 106. The flip-flop 271 samples the master clock signal in response to rising edges of the backup clock signal, and the flip-flop 273 samples the master clock signal in response to falling edges of the backup clock signal. By this arrangement, the two flip-flops 271 and 273 will output master clock samples 272 and 274 having complementary states if the master clock signal is oscillating. That is, if the rising edge of the backup clock signal yields a logic high sample of the master clock signal, then the falling edge of the backup clock signal should yield a logic low sample of the master clock signal, and vice-versa. The state machine 275 receives the master clock samples 272 and 274 from the flip-flops and generates a select signal 138 according to whether the samples indicate that the master clock signal has stopped oscillating. In one embodiment, the state machine 275 outputs a logic low select signal 138 (i.e., to select the master clock signal) so long as a threshold number of successive master clock samples do not have the same state. If the threshold number of successive samples do have the same state, the master clock signal is deemed to have stopped oscillating (e.g., due to deassertion of the master enable signal). In that case, the state machine 275 transitions to a master-fail state and sets the select signal 138 to a logic high level to select the backup clock signal. Note that if the backup clock signal stops oscillating, the state machine 275 is unable to transition to the master-fail state so that the select signal 138 remains at the logic low level to select the master clock signal; a desired result in the case of backup clock failure. Also, if the nominal frequency of the backup and master clock signals is high enough to produce metastability in either of the flip-flops 271 and 273 (i.e., due to sampling the master clock signal during its transition between states), each of the individual flip-flops may be replaced by a chain of flip-flops to reduce the likelihood that a signal having a metastable level will be supplied to the state machine 275. More generally, the clock detect circuit of FIG. 137 may be implemented by any circuit capable of detecting non-oscillation of the master clock signal and changing the state of the select signal 138 in response.

Referring again to FIG. 1, the clock generation circuit 100 may implemented in any system or device in which fault-tolerant clock generation is desired. For example, the clock generation circuit 100 may be implemented in a single integrated circuit (IC) device to improve run-time reliability and/or production yield of the IC. In such an IC device, the clock sources 109, 111 and/or 121 may be implemented by ring-oscillators or other on-chip clock generating devices, or the clock sources may be external crystal oscillators or other clock signal generators coupled to external contacts of the IC. In other implementations the master clock generator 101 may be disposed within an IC device that is distinct from an IC device containing the backup and vote clock generators 103 and 105 and/or an IC device containing the clock select circuit 131. Such an arrangement is particularly beneficial in a system in which the master and backup clock signals 102 and 104 are to be generated on one or more removable system components and delivered to one or more other removable system components, such as removable printed circuit boards coupled through a backplane or other interconnection structure. In such a system, the gating circuit 129 may be split such that the pass gate 133 is disposed on a circuit board (or IC device) containing the master clock generator 101, and the pass gate 135 is disposed on the circuit board (or IC device) containing the backup and vote clock generators 103 and 105.

Figure 7:
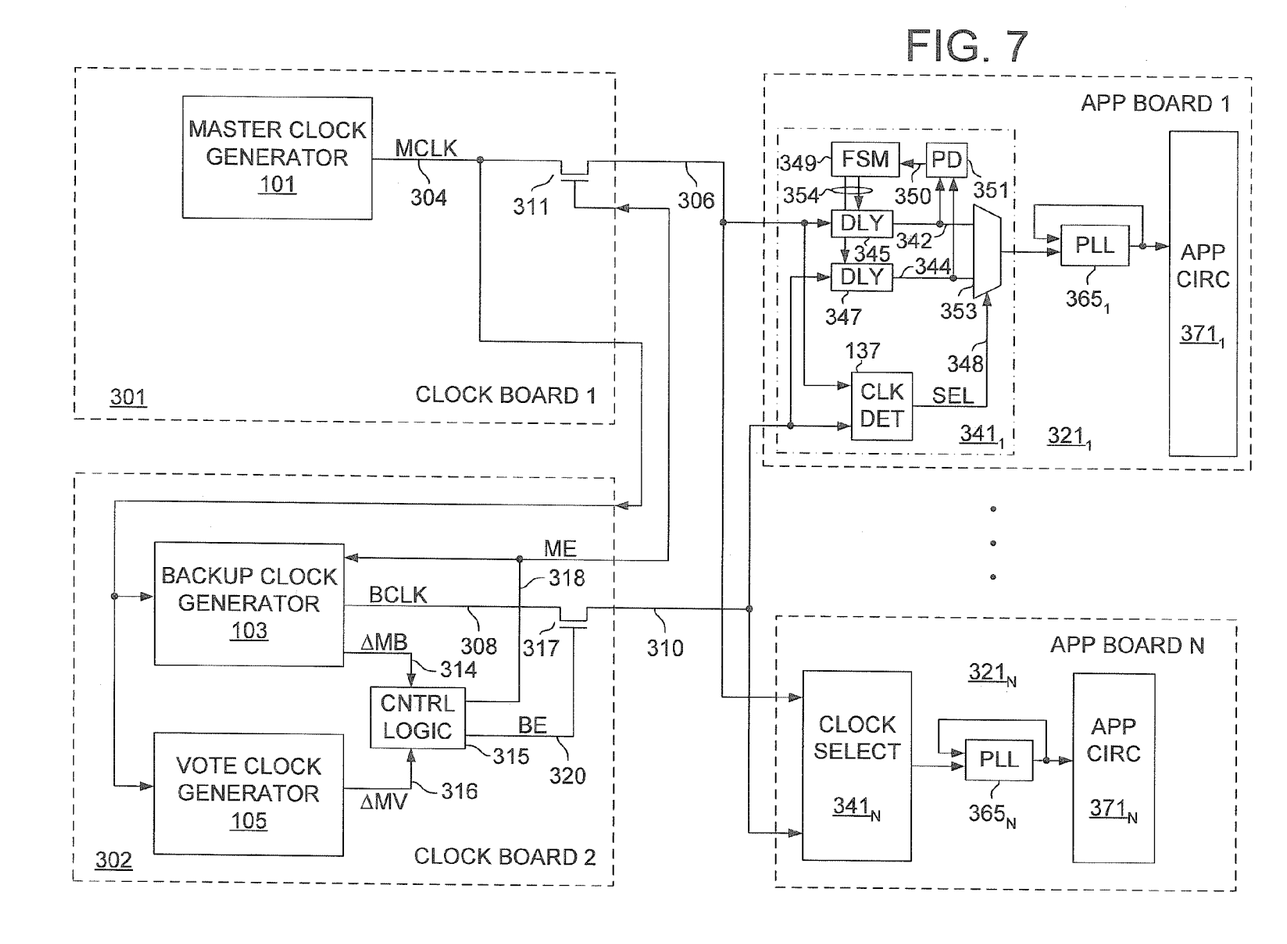
FIG. 7 illustrates an adaptation of the clock generation circuit of FIG. 1 to a system that includes removable clock boards and any number of clocked application circuit boards.

FIG. 7 illustrates an adaptation of the clock generation circuit 100 of FIG. 1 to a system that includes removable clock boards 301 and 302, and any number of clocked application circuit boards $321_1$-$321_N$. One example of such a system is a general or special-purpose computing system in which the clock boards 301, 302 and application circuit boards 321 (which may perform any number of processing functions, data storage functions, input/output functions, etc.) are coupled to one another via one or more backplanes or other interconnection structures. Another example of such a system is a network switching device (e.g., a switch or router) in which the clock boards 301, 302 and application circuit boards 321 are coupled to one another through a common backplane or other interconnection structure. In such a system, the application circuit boards 321 may include circuit boards having clocked storage elements to buffer incoming and outgoing network traffic (e.g., line cards having ingress and/or egress queues), and circuit boards for transferring network traffic between input and output ports (e.g., synchronous switching fabrics). In such systems, the clock generation circuit 100 of FIG. 1 may be used to improve fault tolerance through detection of failure within the master clock generator 101, and automatic switchover to the backup clock generator 103 without loss of clock pulses and without runt pulse generation (i.e., generation of time-shortened pulses).

Still referring to FIG. 7, an IC device containing the master clock generator 101 of FIG. 1 (or multiple IC devices and/or an external clock source to implement the master clock generator) is disposed on a master clock board 301, and an integrated circuit device containing the backup clock generator 103 and vote clock generator 105 (or multiple IC devices and/or external clock sources) is disposed on a backup clock board 302. Master and backup clock signals 304 and 308 are selectively enabled onto master and backup clock lines 306 and 310, respectively, and delivered via a backplane or other interconnect structure to clock select circuits $341_1$-$341_N$ disposed on respective application boards $321_1$-$321_N$. Pass gates 311 and 317 correspond to the pass gates 133 and 135 of FIG. 1, but are split between the two clock boards 301, 302. That is, pass gate 311 is disposed on the master clock board 301 and pass gate 317 is disposed on backup clock board 302. A control logic circuit 315 which operates in generally the same manner as the control logic 127 of FIG. 1 is disposed on the backup clock board 302 along with the backup clock generator 103 and the vote clock generator 105. Because the pass gate 311 is disposed on a remote clock board relative to the control logic 315, a master enable signal 318 (ME) is routed across the backplane (or other interconnect structure) to the master clock board 301. To avoid susceptibility to single point failure in the interconnection between the clock boards 301, multiple instances of the master enable signal 318 may be routed to the master clock board 301 via respective signal lines to permit a master enable voting function on the master clock board 301. In such an implementation, if the master enable signal 318 is deasserted on two or more of the signal lines, the master clock signal 304 is not enabled onto the master clock line 306.

In one embodiment, the master and backup clock boards 301 and 302 may be inserted into any connector slots within a common backplane such that the lengths of the master and backup clock lines 306 and 310 over which the master and backup clock signals travel may be unequal from the perspective of any or all of the application circuit boards 321. Consequently, though the master and backup clock signals may be in phase at their respective points of departure from clock boards 301 and 302 the master and backup clock signals may be substantially out of phase upon arrival at a given one of the application circuit boards 321. If the nominal frequency of the master and backup clock signals is low enough, the phase shift resulting from flight time differences on the master and backup clock lines 306 and 310 may be tolerated (i.e., as in the embodiment of FIG. 1). Alternatively, as shown in the select circuit $341_1$ of FIG. 7, signal-controlled delay lines 345, 347 (DLY) may be provided to realign the phases of the master and/or backup clock signals so that they are arrive substantially in phase at inputs of a multiplexer 353. A phase detector 351 is coupled to the outputs of each of the delay lines 345, 347 to determine which of the delayed clock signals 342, 344 leads the other and to generate a corresponding delay control signal 350. A finite state machine receives the delay control signal 350 from the phase detector 351 and adjusts the delay through the delay lines (e.g., by adjusting a pair of delay control words 354 supplied to the delay lines) as necessary to reduce the phase offset between the delayed clock signals 342 and 344. Thus, if the phase detector 351 indicates that the delayed master clock signal 342 leads the delayed backup clock signal 344, the state machine 349 increases the delay through delay line 345 and correspondingly reduces the delay through delay line 347 to reduce the phase lead of the delayed master clock signal 342. By this arrangement, the state machine 349 eventually establishes delays through the delay lines 345 and 347 that yield substantially phase-aligned clock signals. In an alternative embodiment only one delay line may be provided and the state machine 349 designed to increase the delay as necessary to delay one of the incoming clock signals to match the phase of the other.

The clock detector 137 operates as described in reference to FIGS. 1 and 6 to select, via multiplexer 353, either the delayed master clock signal 342 or the delayed backup clock signal 344 to be supplied to a PLL circuit $365_1$. The PLL circuit $365_1$ operates to prevent the omission of clock pulses in the event of a failure of the master clock generator 101 and ensuing switchover to the backup clock generator 103. As discussed above, if failure detection and switchover are be performed quickly enough to avoid dropping clock pulses in the clock signal output from the multiplexer 353, the PLL circuit 3651 may be omitted. The PLL circuit 3651 may also be omitted in systems in which the application circuit 371 (or application circuits) can tolerate dropped clock pulses.

Figure 8:
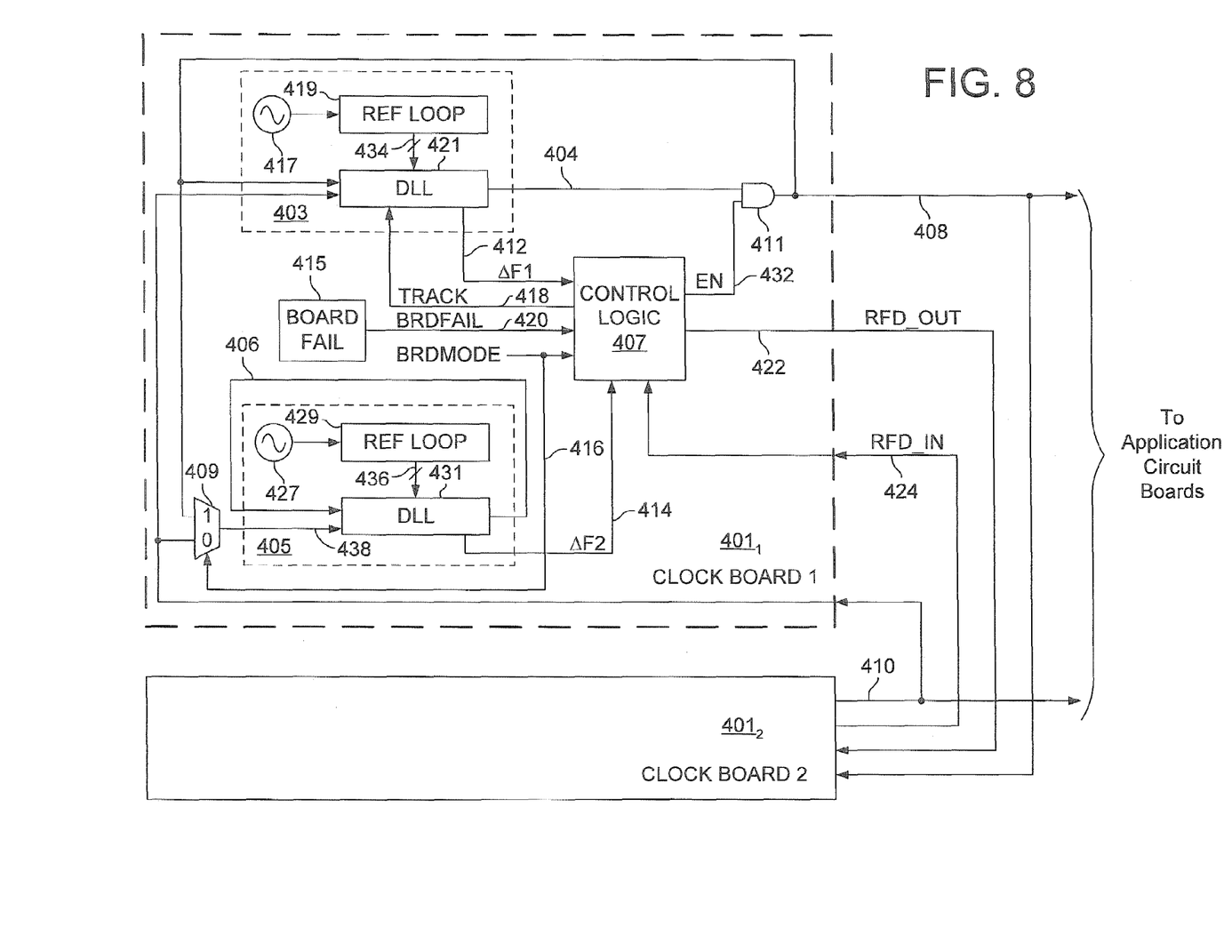
FIG. 8 illustrates a pair of clock circuit boards that may be used in place of the clock boards of FIG. 7.

FIG. 8 illustrates a pair of clock circuit boards $401_1$, $401_2$ that may be used in place of the clock boards 301 and 302 of FIG. 7. The clock circuit boards 401 operate similarly to the clock boards 301 and 302 of FIG. 7, but are modified to enable interchangeability. That is, the clock boards $401_1$ and $401_2$ are identical and each may be operated in either a master mode to generate a master clock signal or in a backup mode to generate a backup clock signal, thereby simplifying system design, verification and maintenance. In one embodiment, backplane or on-board strapping (e.g., jumpers) is used to control the operating mode of each clock board 401 (i.e., master mode or backup mode). Alternatively, a board mode value may be programmed within a configuration storage circuit of each clock board, or a board mode signal may be provided from another circuit board within the system.

Referring to the block diagram view of clock board $401_1$, each clock board 401 includes a primary clock generator 403, secondary clock generator 405, board fail detector 415, control logic 407, multiplexer 409 and gating logic in the form of logic AND gate 411. The primary clock generator 403 includes a clock source 417, reference loop 419 (or PLL circuit), and DLL circuit 421. The clock source 417, reference loop 419 (or PLL circuit) and DLL circuit 421 operate in generally the same manner as the corresponding components of the backup clock generator 103 of FIG. 1 to generate a primary clock signal 404. That is, when a track-enable signal 418 (TRACK) is asserted, the primary clock generator 403 operates in a tracking mode to maintain phase alignment between the primary clock signal 404 and a remotely generated master clock signal 410 (i.e., a clock signal generated by the primary clock generator on clock board $401_2$). When the track-enable signal 418 is deasserted, the primary clock generator 403 operates in a hold mode in which the primary clock signal 404 oscillates at the frequency of a selected one of the phase vectors 434 (i.e., the primary reference) and without phase adjustment by the DLL circuit 421. Like the DLL circuit 115 of FIG. 1, the DLL circuit 421 generates an error value, $\Delta F1$ (i.e., the primary error value), that represents a frequency difference between a master clock signal (i.e., the incoming clock signal 410) and the primary reference. In the embodiment of FIG. 8, the primary clock signal 404 is fed back to an input of the DLL 421 circuit after passing through the logic AND gate 411, and is also coupled to an input of the multiplexer 409. The signal line used to supply primary clock signal 404 to the input of the DLL circuit 421 and/or the multiplexer 409 may alternatively be coupled directly to the output of the DLL circuit 421 instead of the output of the logic AND gate.

The secondary clock generator 405 includes a clock source 427, reference loop 429 (or PLL circuit) and DLL circuit 431 that operate in a tracking mode to generate a secondary clock signal 406 that is phase aligned with a reference clock signal 438 selected by the multiplexer 409. A board mode signal 416 (BRDMODE) is supplied to a control input of the multiplexer 409 to select either the primary clock signal 404 (i.e., before or after passing through the logic AND gate 411) or the remotely generated clock signal 410 to be the reference clock signal 438. In one embodiment, the board mode signal 416 is set to a logic high level to indicate a master mode for the clock board $401_1$, and set to a logic low level to indicate a backup mode for the clock board $401_1$. Thus, when the board mode signal 416 is high (indicating a master mode) and the clock board $401_1$ is operating properly, the primary clock signal 404 is supplied to the DLL circuit 431 and the secondary clock signal 406 is phase aligned with the primary clock signal 404. By contrast, when the board mode signal 416 is low (indicating a backup mode), the remotely generated clock signal 410 is supplied to the DLL circuit 431, and the secondary clock signal 406 is phase aligned with the remotely generated clock signal 410. In either case, master mode or backup mode, the secondary clock generator 405 generates an error value 414 (ΔF2) that represents a frequency difference between the reference clock signal 438 (i.e., primary clock signal or remotely generated master clock signal) and a secondary reference vector (i.e., one of the phase vectors 436 generated by the reference loop 429 (or PLL circuit)). By this arrangement, when the clock board 401₁ is operated in the master mode, the secondary error value 414 indicates a frequency difference between the primary clock signal 404 and the secondary reference vector and therefore enables self-failure detection within the clock board 401₁. When the clock board is operated in the slave mode, both the primary error value 412 and the secondary error value 414 indicate a frequency difference between a respective reference vector (i.e., the primary reference vector and the secondary reference vector, respectively) and the remotely generated clock signal 410.

Still referring to FIG. 8, the board fail logic 415 is provided to detect operating conditions that are likely to result in failure of the clock board 401 and, upon detecting such conditions, to output a board-fail signal 420 (BRDFAIL) to the control logic 407. In one embodiment, for example, the board fail logic 415 includes a power detection circuit to determine when one or more supply voltages drop below a predetermined level. The board fail logic 415 may also include an interconnect detection circuit to detect a loss of interconnection between the clock board 401₁ and a backplane or other interconnecting structure (e.g., due to the clock board being removed from the back plane or otherwise becoming unseated within the backplane). In general, any type and number of board-level and/or system-level failures may be detected by the board fail logic 415 and combined in a logical OR operation (including a wired OR) to generate the board fail signal 407.

The board mode signal 416, board fail signal 420, primary error value 412, and secondary error value 414 are input to the control logic 407 along with a remotely generated signal referred to herein as a remote fail detect input 424 (RFD_IN). The control logic 407 responds to these inputs by generating the track enable signal 418 as well as an enable signal 432, and a remote fail detect output signal 422 (RFD_OUT). The remote fail detect output signal 422 constitutes a remote fail detect input signal to the clock board 401₂, and a remote fail detect output signal generated by the clock board 401₂ constitutes the remote fail detect input signal 424 to the clock board 401₁.

Figure 9:
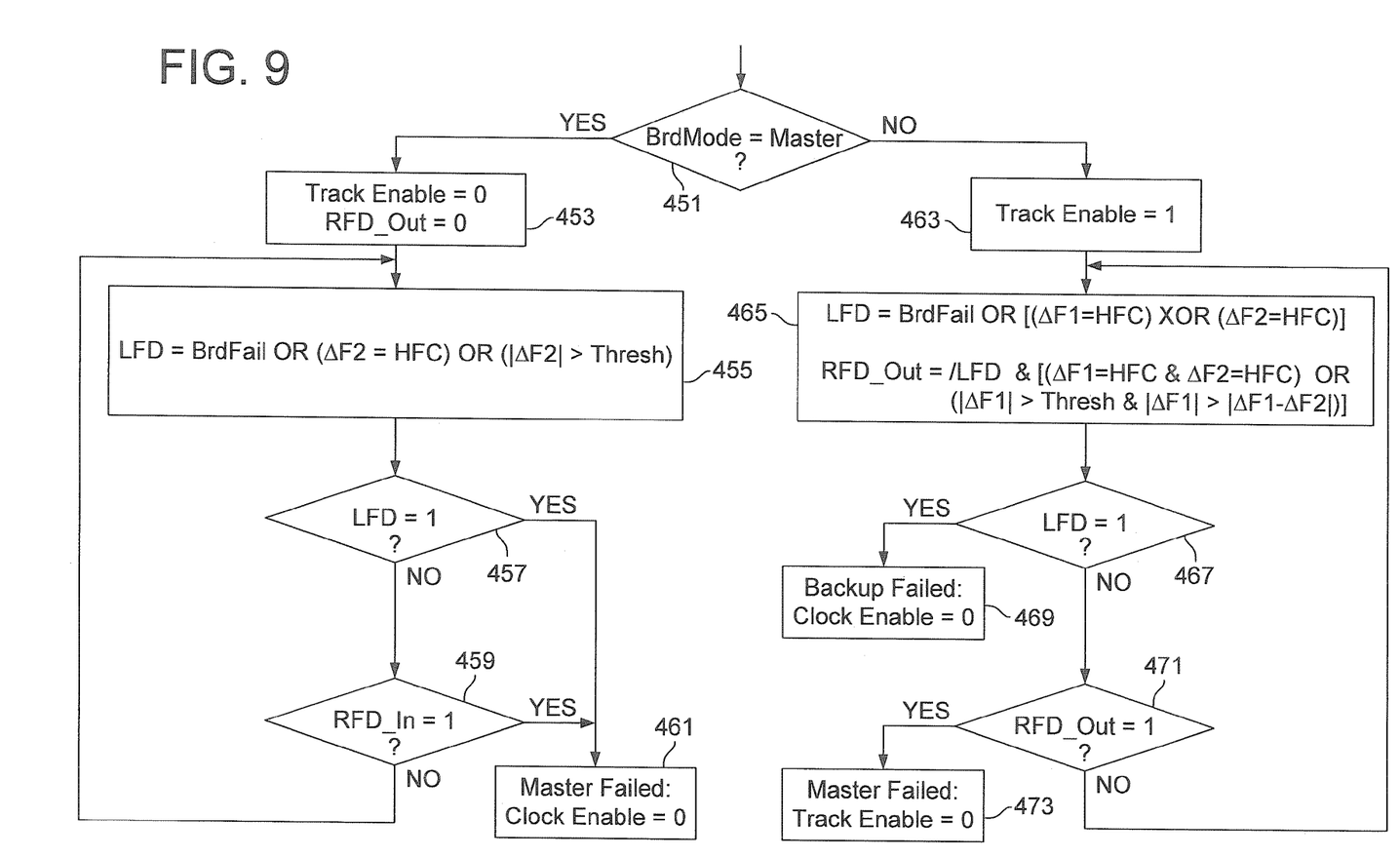
FIG. 9 illustrates an exemplary operation of the control logic of FIG. 8.

FIG. 9 illustrates an exemplary operation of the control logic 407 of FIG. 8. At decision block 451, the board mode signal 416 is evaluated to determine whether the clock board 401₁ is to be operated in a master mode or a backup mode. If master mode is indicated, then at 453 the track enable signal 418 and remote fail detect output signal 422 are deasserted (e.g., set to a logical low level, as indicated by '0' in FIG. 9). By this action, the primary clock generator 403 generates a master clock signal (i.e., primary clock signal 404) at the free running frequency of the clock source 417 (i.e., after multiplication within a PLL circuit or other multiplying circuit if used in place of the reference loop 419), and no remote failure detect signal 422 is output to the backup clock board, 401₂. Also, because the board mode signal 416 indicates the master mode, the secondary clock generator 405 will receive the primary clock signal 404 as the reference clock input (i.e., by operation of the multiplexer 409). Consequently, any error indicated by the secondary error value 414 constitutes an indication of a clock board failure. That is, if the secondary error value 414 indicates a hard fail code or is greater than a predetermined error threshold, then at least one clock generator on the clock board 401₁ has failed. Accordingly, as shown at block 455 of FIG. 9, a local fail detect signal (LFD) is asserted within the control logic 407 if (1) the board failure signal 420 is asserted; (2) the secondary error value 414 indicates a hard fail code or (3) the absolute value of the secondary error value 414 is greater than a predetermined error threshold. Note that comparison of the secondary error value 414 against the hard fail code may be omitted if the hard fail code is a value greater than the predetermined error threshold (e.g., the most significant bit of the error value 414 is reserved to indicate the hard fail code). If the local fail detect signal is asserted (determined at decision block 457), then the clock board 401₁ has failed and the clock enable signal 432 is deasserted at block 461. As discussed below, the remote fail detect input signal 424 (RFD_In), if asserted, indicates that the backup-mode clock board 401₂ has detected a failure of the master clock signal (i.e., the primary clock signal 404 output by the master-mode clock board 401₁). Accordingly, the clock enable signal is also deasserted at 461 if the remote fail detect input signal 424 is determined to be asserted at decision block 459. Thus, in the embodiment of FIGS. 8 and 9, the enable signal 432 may be generated within the control logic 407 by a logic NOR combination of the local fail detect signal (LFD) and remote fail detect input signal 424. The control logic 407 iteratively generates the local fail detect signal and selectively asserts the enable signal 432 as illustrated by blocks 455, 457, 459 and 461 of FIG. 9.

Returning to decision block 451, if the board mode indicates a backup mode of operation, then the track enable signal 418 is asserted in an initialization operation at 463, thereby enabling a tracking mode of operation within the primary clock generator 403. Also, the multiplexer 409 responds to the state of the board mode signal 416 by selecting the incoming clock signal 410 (i.e., a master clock signal generated by master-mode clock board 401₂) as the reference clock signal 438 for the secondary clock generator 405. Thus, shortly after the track enable signal 418 is asserted at block 463, both the primary and secondary clock generators 403 and 405 generate clock signals that are phase aligned to an incoming master clock signal 410. By this operation, the primary and secondary clock generators 403 and 405, in effect, operate as the backup and vote clock 103 and 105 generators of FIG. 1. Accordingly, as shown at 465, a local fail detect signal (LFD) is asserted within the control logic 407 (1) the board fail signal 420 is asserted; (2) either, but not both, of the primary and secondary error values 412 and 414 are set to the hard fail code (i.e., (ΔF1=HFC) XOR (ΔF2=HFC)). Also, the remote fail detect output signal 422 is asserted to disable output of the remotely generated master clock signal if the local fail detect signal is not asserted (/LFD) and either (1) both the primary and secondary error values 412, 414 indicate the hard fail code, or (2) the absolute value of the primary error value 412 exceeds both (i) the error threshold and (ii) the absolute value of the difference between the primary and secondary error values 412, 414 (i.e., |ΔF1|>Thresh & |ΔF1|>|ΔF1−ΔF2|). Note that the determination of whether the absolute value of the primary error value 412 exceeds both the error threshold and the absolute value of the difference between the primary and secondary error values 412, 414 corresponds to the vote determination described in reference to FIGS. 1 and 2. That is, a determination that the absolute value of the primary error value 412 exceeds the error threshold constitutes a determination that the primary reference and the incoming master clock signal 410 differ in frequency beyond tolerance. The determination that the absolute value of the primary error value 412 exceeds the absolute value of the difference between the primary and secondary error values 412, 414 constitutes a determination that the secondary reference is nearer in frequency to the primary reference than to the incoming master clock signal 410. If the local fail detect signal is asserted (determined at decision block 467 of FIG. 9), then the clock board 401₁ has failed and the enable signal 432 is deasserted. Thus, the enable signal 432 may be generated by complementing the local fail detect signal (EN=/ LFD). If the remote fail detect output signal 422 is asserted (determined at decision block 471 of FIG. 9), then a failure of the master-mode clock board 401₂ has been detected. Accordingly, at 473, the track enable signal 418 is deasserted to enable a hold mode of operation within the primary clock generator of the slave-mode clock board. Thus, the track enable signal 418 may be generated by complementing the remote fail detect output signal 422.

Note that, in an alternative embodiment of the control logic 407, the local fail detect signal may be asserted in a backup-mode-configured clock board 401 if the absolute value of the primary error value 412 exceeds the error threshold, but does not exceed the absolute value of the difference between the primary and secondary error values 412 and 414 (such a determination corresponds to the negative determination at decision block 189 of FIG. 2). Similarly, the local fail detect signal may be asserted if the absolute value of the primary error 412 does not exceed the error threshold, but the absolute value of the secondary error value 414 does exceed the error threshold (such a determination corresponds to the affirmative determination at decision block 193 of FIG. 2). Also, due to the exclusive OR term in the local fail detect determination in block 465 of FIG. 9, the term ($\Delta$F1=HFC & $\Delta$F2=HFC) may be simplified to ($\Delta$F1=HFC) or to ($\Delta$F2=HFC) within the expression in block 465 for the RFD_Out signal. More generally, the operation of the control logic 407 of FIG. 8 has been illustrated in FIG. 9 for purposes of example only, and been may altered in numerous ways without departing from the spirit and scope of the present invention. Also, as discussed above in reference to FIG. 1, instead of disabling output of the primary clock signal 404 in response to a failure detection, the local fail detect and remote fail detect output signals generated by a given clock board 401 may be provided to clock select circuits on application circuit boards to enable clock selection.

Although the invention has been described with reference to specific exemplary embodiments thereof, it will be evident that various modifications and changes may be made thereto without departing from the broader spirit and scope of the invention. Accordingly, the specification and drawings are to be regarded in an illustrative rather than a restrictive sense.

The invention claimed is:

1. An apparatus comprising:
a first clock signal generator to output a first clock signal;
a second clock signal generator to output a second clock signal and coupled to receive the first clock signal and an enable signal, the second clock signal generator includes a clock source to output a first reference clock signal, and the second clock signal generator to output a first error value that indicates a frequency difference between the first clock signal and the first reference clock signal, the second clock signal generator includes
a locked loop circuit being coupled to receive the first reference clock signal, the locked loop circuit to determine a phase difference between the first clock signal and the second clock signal and, in response to the enable signal, to adjust a phase of the second clock signal to reduce the phase difference;
a third clock signal generator coupled to receive the first clock signal, the third clock signal generator includes a clock source to output a second reference clock signal and, the third clock generator to output a second error value that indicates a frequency difference between the second reference clock signal and the first clock signal; and
a fail detect circuit to detect a failure in the first clock signal generator, output the enable signal and determine which of the first and second clock signals is oscillating at a frequency nearest the frequency of the third clock signal.

2. The apparatus of claim 1, wherein the first error value is output to the fail detect circuit.

3. The apparatus of claim 1, wherein the fail detect circuit deasserts the enable signal in response to determining that the frequency difference indicated by the first error value exceeds a threshold frequency difference.

4. The apparatus of claim 1, wherein the first and second error values are output to the fail detect circuit.

5. The apparatus of claim 1, wherein the fail detect circuit deasserts the enable signal when the frequency difference indicated by the second error value exceeds a threshold frequency difference and when the frequency of the second clock signal is nearest the frequency of the third clock signal.

6. The apparatus of claim 1, wherein the second clock generator includes, a phase detector to output an adjust signal in response to the first clock signal and a feedback signal;
a phase control circuit to output a phase control word in response to the adjust signal and the enable signal; and
a interpolator circuit to output the feedback signal in response to the phase control word and the first reference clock signal.

7. A method comprising:
generating a first clock signal;
generating a first reference clock signal;
generating a second clock signal in response to the first reference clock signal;
adjusting a phase of the second clock signal to maintain phase alignment between the first clock signal and the second clock signal while an enable signal is asserted;
generating a first error value that indicates a frequency difference between the first clock signal and the first reference clock signal;
comparing the first error value to an error threshold value;
deasserting the enable signal to halt adjustment of the phase of the second clock signal in response to the comparing;
generating a third clock signal in response to a second reference clock signal;
generating a second error value that indicates a frequency difference between the first clock signal and the second reference clock signal; and
determining which of the first and second clock signals is oscillating at a frequency nearest the frequency of the third clock signal.

8. The method of claim 7, wherein the deasserting occurs when the frequency difference indicated by the second error value exceeds a threshold frequency difference and when the frequency of the second clock signal is nearest the frequency of the third clock signal.

9. The method of claim 7, wherein the method is performed in an integrated circuit.

10. The method of claim 7, wherein the method is performed in a plurality of circuit boards.

* * * * *